(12) United States Patent
Clark et al.

(10) Patent No.: US 6,938,491 B2
(45) Date of Patent: Sep. 6, 2005

(54) ENGINE CYLINDER PRESSURE SENSOR

(75) Inventors: David Cameron Clark, Elkhart, IN (US); Craig N. Ernsberger, Granger, IN (US)

(73) Assignee: CTS Corporation, Elkhart, IN (US)

(*) Notice: Subject to any disclaimer, the term of this patent is extended or adjusted under 35 U.S.C. 154(b) by 0 days.

(21) Appl. No.: 10/417,593

(22) Filed: Apr. 17, 2003

(65) Prior Publication Data

US 2004/0206186 A1 Oct. 21, 2004

(51) Int. Cl.$^7$ ............................................. G01L 9/00
(52) U.S. Cl. ......................................................... 73/753
(58) Field of Search .................. 73/700–756, 35.11–13; 123/435

(56) References Cited

U.S. PATENT DOCUMENTS

| | | | |
|---|---|---|---|
| 3,349,259 A | 10/1967 | Kistler | |
| 3,673,443 A | 6/1972 | Siegel | |
| 3,801,838 A | 4/1974 | Kistler | |
| 4,524,625 A | 6/1985 | Takeuchi | |
| 4,620,438 A | * 11/1986 | Howng | 73/35.13 |
| 5,025,228 A | * 6/1991 | Gerard et al. | 331/69 |
| 5,777,239 A | 7/1998 | Fuglewicz | |
| 6,138,654 A | * 10/2000 | Pretorius et al. | 123/642 |
| 6,279,395 B1 | 8/2001 | Insalaco | |

FOREIGN PATENT DOCUMENTS

GB          1246925           9/1971

OTHER PUBLICATIONS

Dirk Schiefer, Ralf Maennel, Wesley Nardoni "Advantages of Diesel Engine Control Using In–Cylinder Pressure Information for Closed Loop Control" Mar. 3, 2003 Reprinted from *Electronic Engine Controls* 2003 (SP–1749).

* cited by examiner

*Primary Examiner*—William Oen
*Assistant Examiner*—Jermaine Jenkins
(74) *Attorney, Agent, or Firm*—Mark P. Bourgeois

(57) ABSTRACT

A pressure sensor for an internal combustion engine cylinder. The sensor has a housing with a pair of ends and a bore that extends through the housing. A barrel is mounted in the bore toward one end. The barrel has a cavity. A piezoelectric body is mounted in the cavity. The piezoelectric body has a first and second electrode. The piezoelectric body generates an electrical signal that is indicative of the pressure in the cylinder. A plate is mounted adjacent the barrel. The plate retains the barrel in the housing. An electronic circuit is mounted in the bore toward the other end. The electronic circuit is electrically connected to the electrodes. The electronic circuit receives the electrical signal from the electrodes and provides a conditioned electrical signal as an output.

20 Claims, 7 Drawing Sheets

ENGINE CYLINDER PRESSURE SENSOR

BACKGROUND OF THE INVENTION

1. Field of the Invention

The present invention relates to pressure sensors and in particular to a pressure sensor for use in internal combustion engines.

2. Description of the Related Art

Internal combustion engines generate high pressures inside the cylinder during operation. The pressure generated during combustion is useful for gaining an understanding of the combustion process and also can be used to control the operation of the engine. Measuring the pressure change over time in the combustion chamber can be used as a parameter in the control of spark timing and valve actuation. The advent of computerized engine controls has allowed the use of additional information in the control algorithms. The computer allows for accurate analysis of the change of pressure with high precision. A more affordable pressure sensor is needed for better control. Emission regulations are driving a need to monitor combustion pressure for all cylinders on a vehicle.

A pressure sensor for an engine has to be able to handle high thermal stresses during combustion, chemical attack and vibration from mechanical load cycles. The pressure sensor must be stable and insensitive to temperature changes in a harsh environment.

Various types of sensors have previously been used to measure pressure inside the cylinder. These sensors have suffered from a variety of problems with accuracy, cost and reliability. Quartz pressure sensors have been used for measuring pressure. The quartz sensor undergoes a change in charge when compressed which is directly proportional to the applied force. A diaphragm is placed between the sensor and the environment to be sensed. As the pressure changes, the force on the diaphragm is changed and therefore the force on the sensor. Unfortunately, with large thermal gradients, the outside surface of the diaphragm expands while next to hot combustion gases. The inner surface of the diaphragm being cooler does not expand as much. The net effect is that the diaphragm oil cans or bends away from the sensor toward the higher temperature. When this happens, the sensed force has an inaccurate reading that is less than actual because of the loss of contact between the diaphragm and the quartz sensor. After repeated thermal cycling, the diaphragm welds can break and cause a sensor failure. The diaphragm can also abrade or corrode causing a failure. Quartz pressure sensors are also very expensive and not suited to high volume manufacturing.

A current unmet need exists for an automobile engine cylinder pressure sensor that has improved accuracy, reliability and is low in cost.

SUMMARY OF THE INVENTION

It is a feature of the present invention to provide a pressure sensor for an internal combustion engine.

It is a feature of the present invention to provide a pressure sensor that includes a housing having a pair of ends and a bore that extends through the housing. A barrel is mounted in the bore toward one end. The barrel has a cavity. A piezoelectric body is mounted in the cavity. The piezoelectric body has a first and second electrode. The piezoelectric body generates an electrical signal that is indicative of a pressure being sensed. A plate is mounted adjacent the barrel. The plate retains the barrel in the housing. An electronic circuit is mounted in the bore toward the other end. The electronic circuit is electrically connected to the electrodes. The electronic circuit is adapted to receive the electrical signal as an input and provide a conditioned electrical signal as an output.

BRIEF DESCRIPTION OF THE DRAWINGS

It is noted that the drawings of the invention are not to scale. In the drawings, like numbering represents like elements between the drawings.

DETAILED DESCRIPTION

Figure 1:
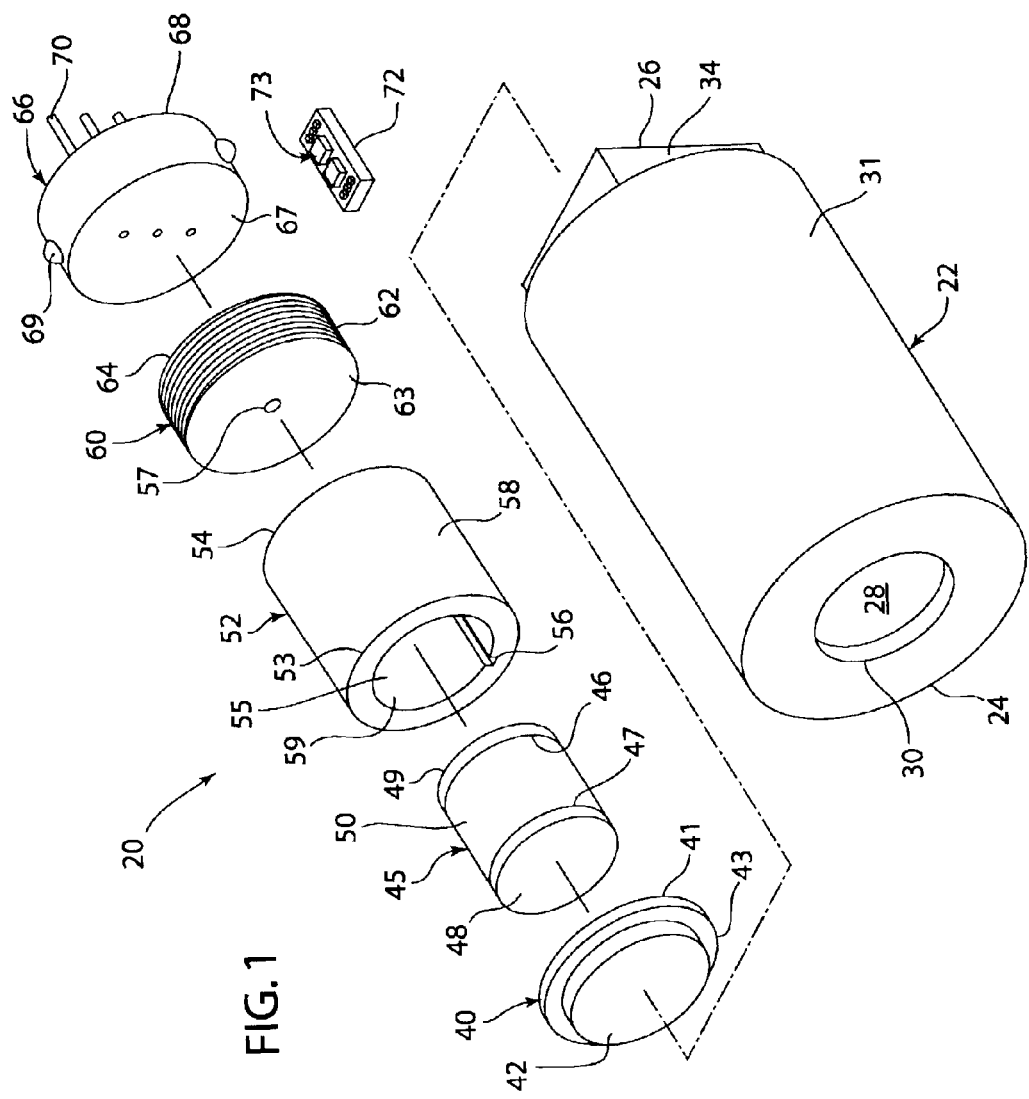
FIG. 1 is an exploded perspective view of an engine cylinder pressure sensor.
Figure 2:
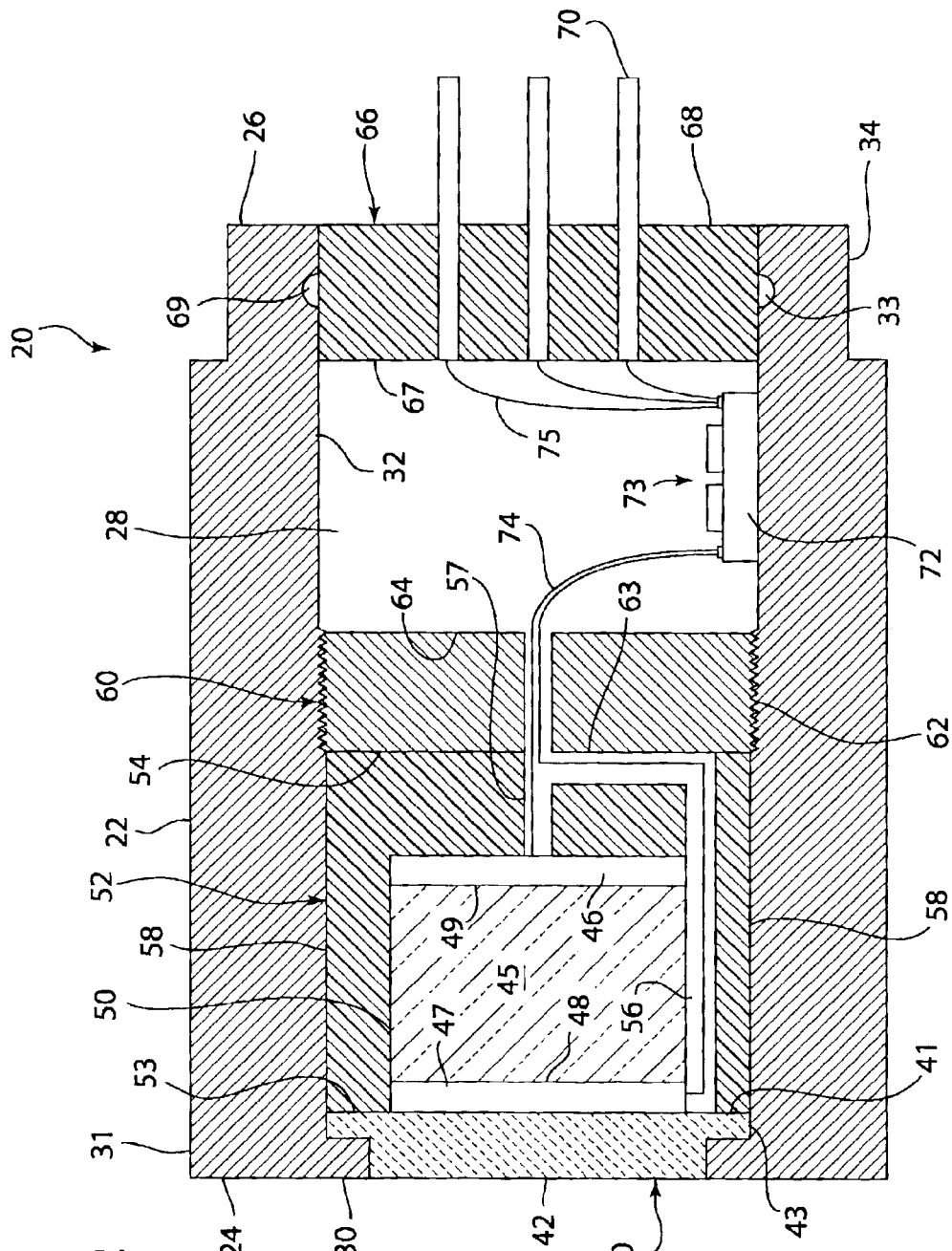
FIG. 2 is a cross-sectional view of FIG. 1.

Referring to FIGS. 1–2, an engine cylinder pressure sensor 20 is shown. Pressure sensor 20 includes a cylindrical housing 22 has ends 24 and 26. A bore 28 extends through the center of housing 22. At end 24, the housing has a lip 30 that extends into the bore 28. The housing has an outer surface 31 and an inner surface 32. A pair of recesses 33 are located toward end 26. Several flat surfaces 34 are placed on the outside of housing 22 so that a wrench can rotate the sensor. The housing can be made out of metal such as stainless steel. The housing would typically have threads on the outside in order to attach it to a cylinder head on an internal combustion engine. The cylinder head would have a threaded opening which leads into the combustion chamber. The housing would screw into this threaded opening. Other methods of attaching the housing could be used such as press fitting, adhesives or fasteners.

A ceramic heat shield 40 is mounted at end 24 inside of bore 28. The heat shield has a top surface 41, a bottom surface 42 and a flange 43. The flange 43 rests against lip 30 and retains the heat shield to the housing. The heat shield prevents the heat developed during the combustion process from possibly causing damage to the sensor. Heat shield 40 can be formed from a Glass-Alumina ceramic. Heat shield 40 has a low thermal conductivity.

An insulative barrel 52 is mounted in bore 28. Barrel 52 has ends 53, 54 and a cavity 55. Barrel 52 has an inner surface 59 and an outer surface 58. A wire passage 56 extends along the inner surface 59 and passes through end 54. Another wire passage 57 extends through end 54. Barrel 55 fits into bore 28. The barrel can be formed from an high temperature insulative elastic material such as a thermoplastic or a thermoset.

A piezoelectric body 45 is mounted in cavity 55. Piezoelectric body 45 has a pair of surfaces 46 and 47. Electrode 48 is attached to surface 47 and electrode 49 is attached to surface 46. Piezoelectric body 45 has an outer side surface 50. Piezoelectric body 45 can be formed from a ceramic material such as bismuth titanate that is commercially available from Sinocera Corporation of State College, Pa. Other materials such as lead metaniobate, quartz or langasite can also be used. The material used needs to have a high curie temperature above 500 degrees Centigrade and a high pressure response. Bismuth titanate has a curie temperature of above 600 degrees Centigrade, a co-efficient of thermal expansion of 5.5 ppm degrees Fahrenheit and a piezoelectric charge constant in the D33 direction of 18 pico-coulombs per Newton.

These parameters give a pressure sensor that is stable with a high output. The electrodes are preferably formed from gold that is sputtered onto the body. During manufacturing, the piezoelectric body is poled by applying a high voltage between electrodes 48 and 49. The high voltage causes the ferro-electric domains to be aligned along an axis extending between the electrodes. Poling allows the body 45 to be sensitive to forces applied in one direction more than forces applied in other directions.

A plate 60 has ends 63, 64 and threads 62. Plate 60 is screwed into bore 28. Threads 62 have female threads on surface 32 and male threads on the outer surface of plate 60. End 63 presses on end 54 and retains barrel 58 and heat shield 40 in bore 28. Wire passage 57 extends through plate 60.

A cap 66 has ends 67 and 68. Cap 66 has protrusions 69 that extend outwardly. Cap 66 fits into bore 28 at housing end 26. Protrusions 69 press fit into recesses 33 to retain cap 66 to housing 22. Cap 66 seals bore 28. Cap 66 can be formed from plastic. Cap 66 has three molded in terminals 70.

Terminals 70 are connected by wires 75 to an electronic circuit 73. Electronic circuit 73 is mounted to a substrate 72. Substrate 72 is mounted to inside surface 32. Wires 74 electrically connect circuit 73 to electrodes 48 and 49. Wires 74 pass through wire passages 56 and 57. Wires 74 and 75 are attached to electrodes 48 and 49 by a high temperature solder. Similarly, wires 74 and 75 are attached to substrate 72 by a high temperature solder.

Electronic circuit 73 amplifies and conditions the electrical signal produced at the electrodes. Electronic circuit 73 uses a charge amplifier to covert the charge signal from the electrodes to a voltage signal. The circuit 73 compensates the voltage signal for the pyroelectric effect and scales the output to a desired range. The pyroelectric effect causes a change in output due to a change in temperature on body 45.

Figure 3:
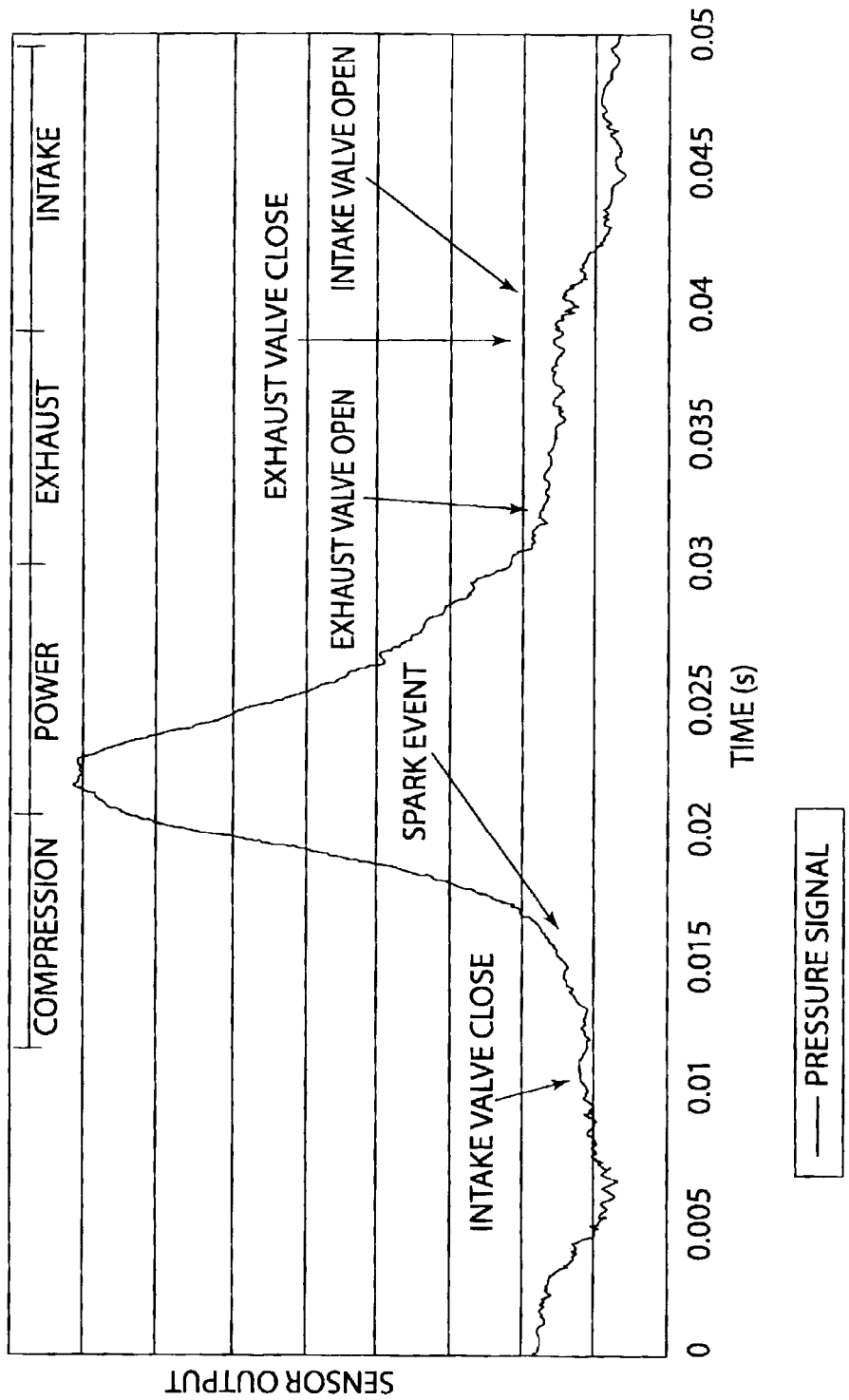
FIG. 3 is a graph of pressure versus time for the sensor of FIG. 1.

FIG. 3 shows a graph of pressure versus time for sensor 20 used in an internal combustion engine. Several engine events have been labeled on the graph such as the opening and closing of valves and firing of the spark plug. As the engine cylinder pressure rises, the pressure on body 45 rises causing a change in the amount of charge on electrodes 48 and 49. This change is sensed and amplified by electronic circuit 73 and provided as an output signal on terminals 70.

Assembly Process

Sensor 20 would be assembled in the following process steps:
1. Wires 74 are soldered to electrodes 48 and 49.
2. Body 45 is placed into cavity 55 with wires 74 extending through passages 56 and 57.
3. Heat shield 40 is placed into bore 28 with flange 43 resting on lip 30.
4. Barrel 52 with body 45 is placed into bore 28 against heat shield 40.
5. Wires 74 are brought out through plate 60.
6. Plate 60 is screwed into housing 22 against barrel 52.
7. Substrate 72 is attached in bore 28.
8. Wires 75 are attached to terminals 70 and circuit 73.
9. Cap 66 is snap-fit into housing 22.
10. Sensor 20 is electrically tested.

Preferred Embodiment

Figure 4:
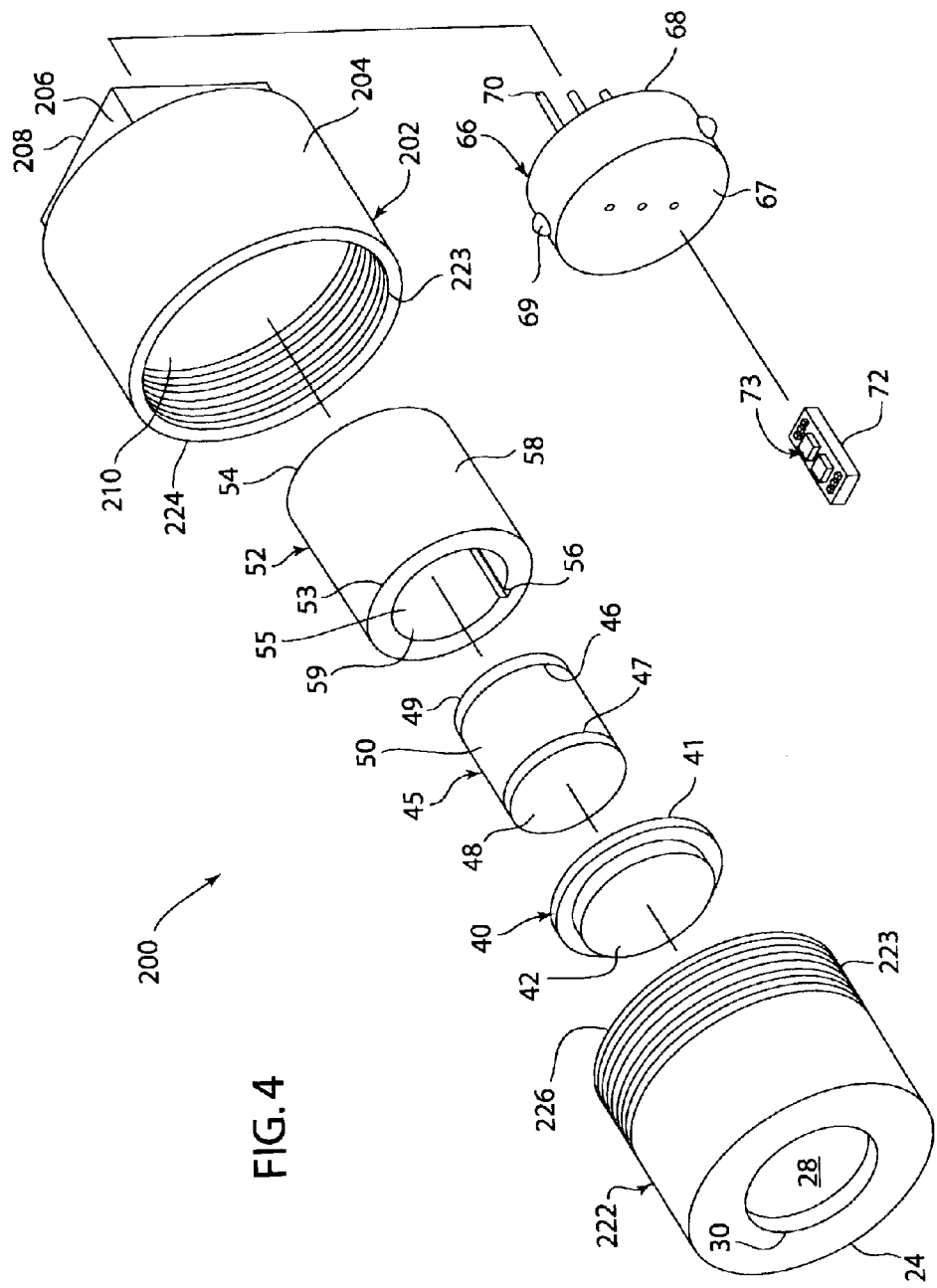
FIG. 4 is an exploded perspective view of the preferred embodiment of an engine cylinder pressure sensor.
Figure 5:
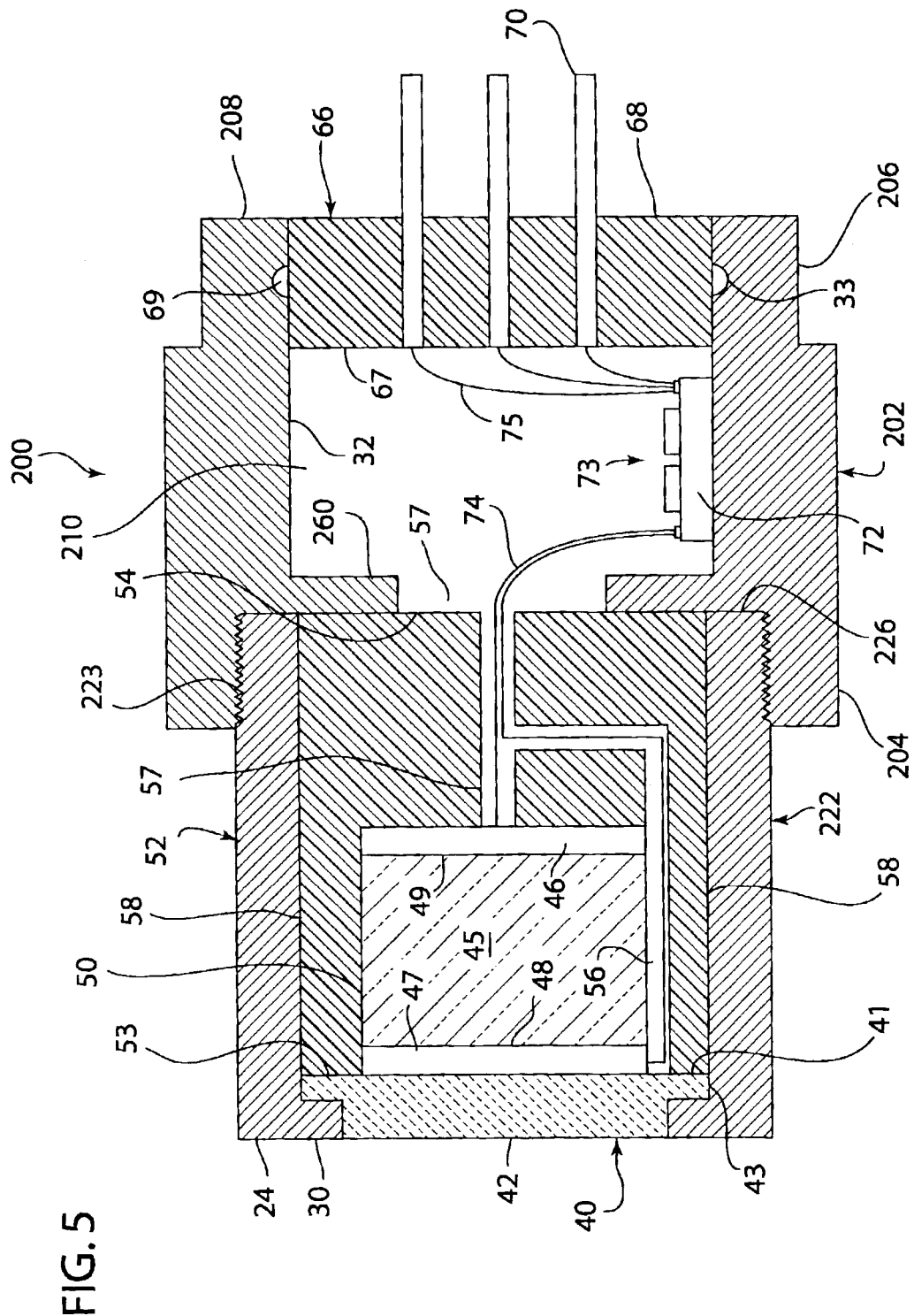
FIG. 5 is a cross-sectional view of FIG. 4.

Referring to FIGS. 4–5, the preferred embodiment of an engine cylinder pressure sensor 200 is shown. Pressure sensor 200 is similar to sensor 20. In sensor 200, the housing 22 has been replaced by a two piece housing that includes inner housing 222 and outer housing 202. Inner housing 222 has an end 226 and threads 223 on the outer circumference near end 226. Outer housing 202 has an end 208, cavity 210, outer surface 204, flat surfaces 206, threads 223 and flange 260. Threads 223 are located in the inner circumference near end 224. The inner housing 222 is screwed into the outer housing 202. The body 45 is retained in barrel 58, which is contained in bore 28. After assembly, the flange 260 of outer housing 202 presses on barrel end 54. The barrel 58 is retained between lip 30 and flange 260 in bore 28. By rotating the inner housing relative to the outer housing the amount of initial pressure on the piezoelectric body 45 can be adjusted. Electronic circuitry 73 is mounted in cavity 210 the same as in sensor 20. The operation of sensor 200 is the same as for sensor 20.

Remarks

One of ordinary skill in the art of designing and using pressure sensors will realize many advantages from using the present invention. The elimination of the diaphragm of prior art sensors eliminates one of the major sources of sensor failure and also results in a lower cost assembly.

An additional advantage of the present invention is improved sensitivity to changes in pressure. Since the piezoelectric body is in direct contact with the pressure vessel, the sensor can react directly to changes in pressure. Sensors of the prior art have a diaphragm located between the sensor and the pressure vessel. The diaphragm reduces response time and accuracy of the sensor.

Another advantage of the present invention is that it incorporates signal conditioning electronics adjacent the sensor. Locating the signal conditioning electronics adjacent the sensor reduces problems of EMI/EMC noise and improves the sensor response time.

Alternative Embodiment

Figure 6:
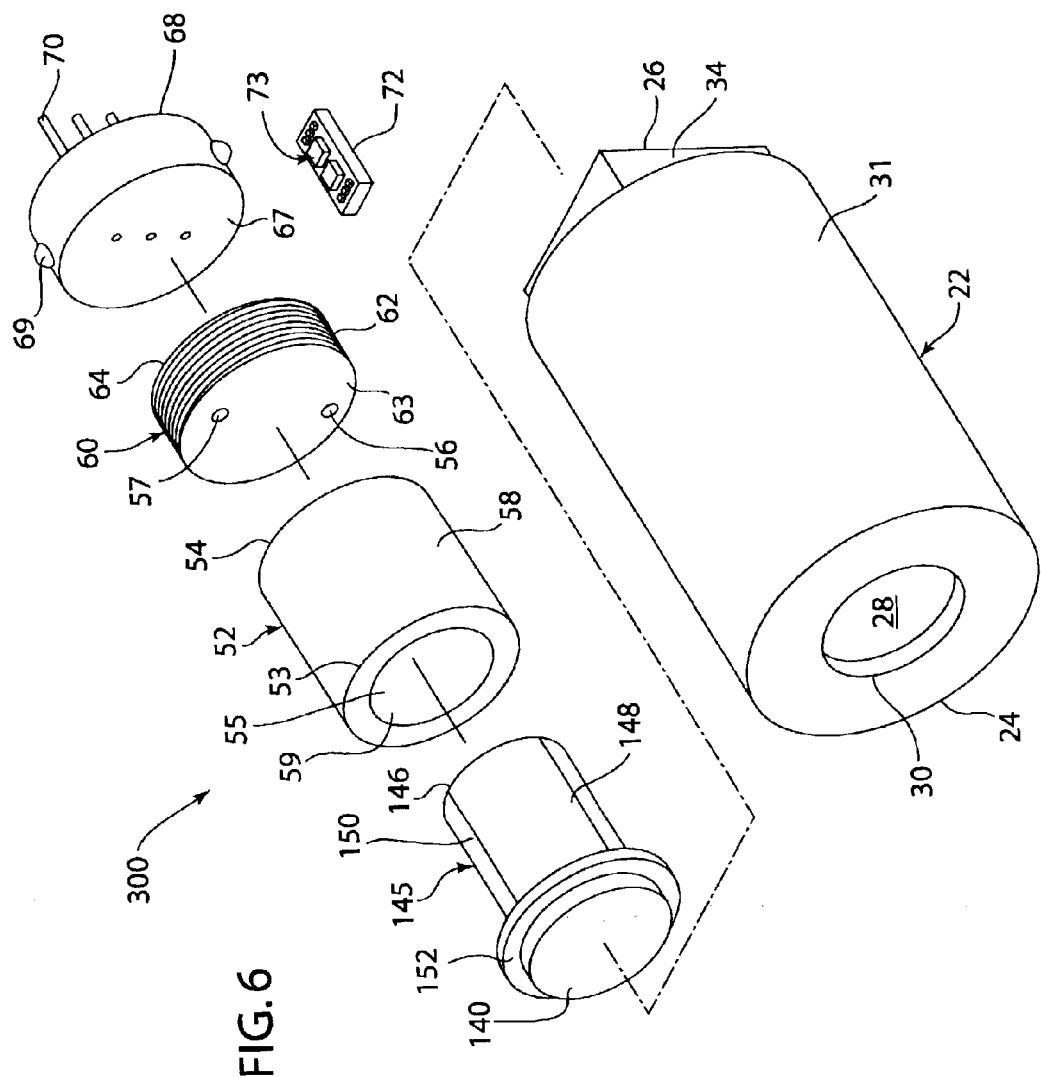
FIG. 6 is an exploded perspective view of another embodiment of an engine cylinder pressure sensor.
Figure 7:
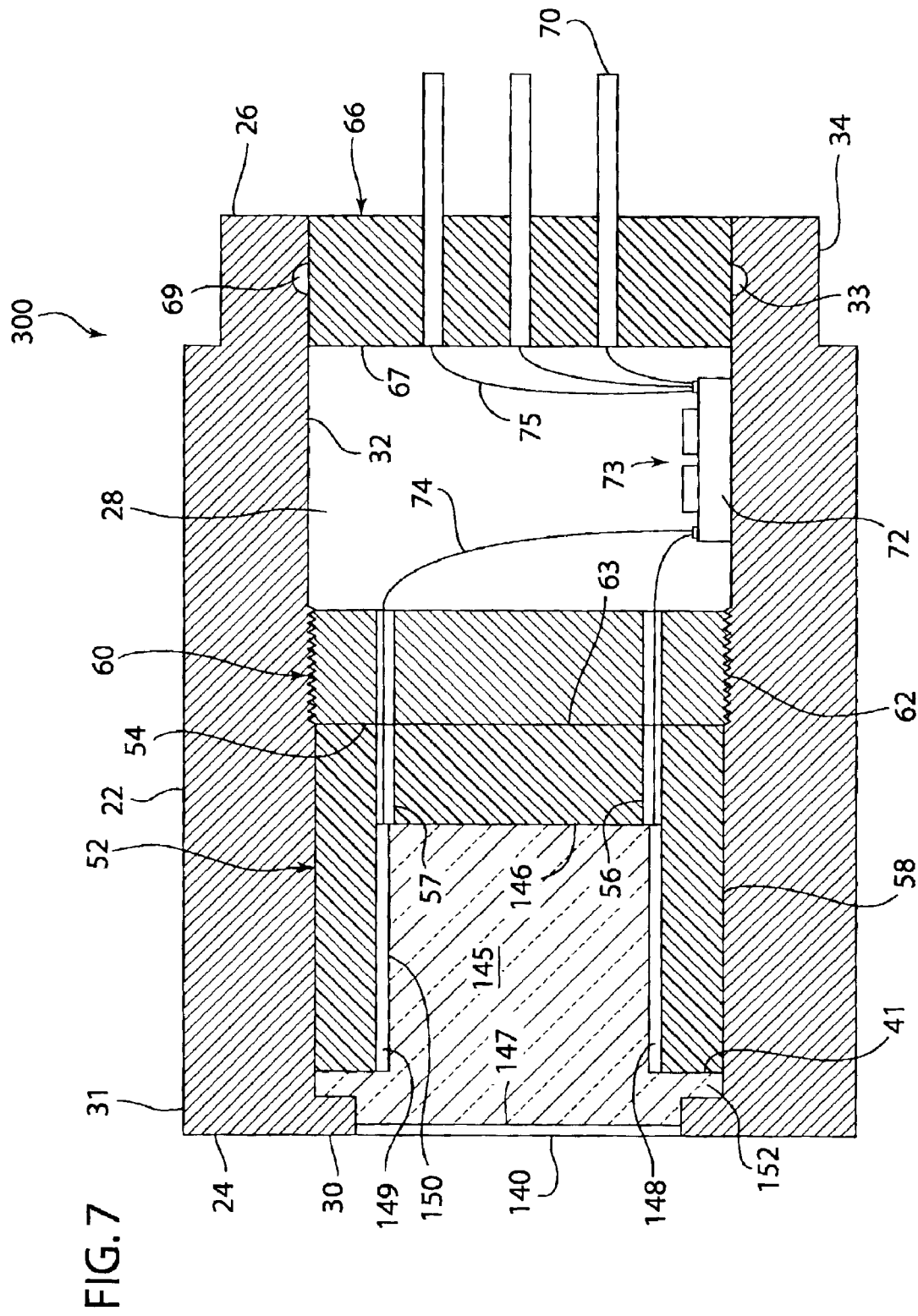
FIG. 7 is a cross-sectional view of FIG. 6.

Referring to FIGS. 6–7, another embodiment of an engine cylinder pressure sensor 300 is shown. Pressure sensor 300 is similar to sensor 20. In sensor 300, the electrode location has been moved from the ends of the piezoelectric body 145 to the outer surface 150.

The piezoelectric body 145 is mounted in cavity 55. Piezoelectric body 145 has ends 146 and 147. A thin heat shield 140 is applied to end 147. Heat shield 140 is exposed to the combustion chamber. The flange 152 rests against lip 30 and retains the body 145 to the housing. The flange 152 and area extending out toward end 147 insulates the electrodes and prevents the heat developed during the combustion process from possibly causing damage to the electrodes.

Gold electrodes 148 and 149 are attached to outer surface 150. Piezoelectric body 145 is formed from the same material as body 45. Wires 74 pass through wire passages 56 and 57 to connect with electrodes 148 and 149.

It is noted that in sensor 300 the piezoelectric body 145 is poled between the electrodes. The poling of body 145 is perpendicular to the poling of body 45. Piezoelectric body 145 will measure pressure that is developed between electrodes 148 and 149. In sensor 300, the barrel 52 should be made out of a material that is less flexible or elastic than in sensor 20 in order to promote the transfer of pressure along the axis between the electrodes.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pressure sensor comprising:
   a) a housing having a first end and a second end and a bore extending therethrough, the housing adapted to be mounted to an engine cylinder;
   b) a heat shield mounted in the bore adjacent the first end, the heat shield adapted to be exposed to the cylinder;
   c) a barrel mounted in the bore adjacent the heat shield, the barrel having a cavity
   d) a piezoelectric body mounted in the cavity, the piezoelectric body having a first and second surface, the piezoelectric body generating an electrical signal that is indicative of a pressure being sensed;
   e) a first electrode mounted on the first surface, the heat shield located adjacent the first electrode;
   f) a second electrode mounted on the second surface;
   g) a first and second terminal mounted to the housing and electrically connected to the first and second electrodes, the first and second terminals adapted to provide an electrical connection to the electrical signal.

2. The pressure sensor according to claim 1, wherein an electronic circuit is mounted in the bore to condition the electrical signal.

3. The pressure sensor according to claim 2, wherein a first and second wire are connected between the first and second electrodes and the electronic circuit.

4. The pressure sensor according to claim 3, wherein a plate is mounted adjacent the barrel, the plate retaining the barrel in the housing and the first and second wires pass through a wire passage in the plate and the barrel.

5. The pressure sensor according to claim 1, wherein the plate is threaded and a portion of the bore is threaded, the plate being retained in the housing by the threads.

6. The pressure sensor according to claim 1, wherein the heat shield has a flange, the flange retaining the heat shield in the housing.

7. The pressure sensor according to claim 1, wherein the piezoelectric body is chosen from the group consisting of:
   a) bismuth titanate;
   b) lead metaniobate;
   c) langasite.

8. The pressure sensor according to claim 1, wherein the piezoelectric body has a flange and the housing has a lip, the flange engaging the lip to retain the piezoelectric body in the housing.

9. A pressure sensor for sensing pressure in an internal combustion engine cylinder comprising:
   a) a housing having a first end and a second end and a bore extending therethrough, the housing adapted to be mounted to the engine cylinder;
   b) a barrel mounted in the bore adjacent the first end, the barrel having a cavity;
   c) a piezoelectric body mounted in the cavity, the piezoelectric body generating an electrical signal that is indicative of a pressure in the engine cylinder;
   d) a first and second electrode mounted on the piezoelectric body;
   e) a first and second terminal mounted to the housing and electrically connected to the first and second electrodes, the first and second terminals adapted to provide an electrical connection for the electrical signal; and
   f) a heat shield mounted in the bore adjacent the piezoelectric body, the heat shield adapted to be exposed to the engine cylinder.

10. The pressure sensor according to claim 9, wherein an electronic circuit is mounted in the bore adjacent the barrel to condition the electrical signal.

11. The pressure sensor according to claim 10, wherein a first and second wire are connected between the first and second electrodes and the electronic circuit.

12. The pressure sensor according to claim 11, wherein the housing has an inner housing and an outer housing.

13. The pressure sensor according to claim 12, wherein the outer housing has a flange, the flange retaining the barrel in the housing.

14. A pressure sensor for measuring the pressure of a pressurized medium comprising:
   a) a housing having a first end and a second end;
   b) a bore extending through the housing;
   c) a barrel mounted in the bore toward the first end, the barrel having a cavity;
   d) a piezoelectric body mounted in the cavity, the piezoelectric body having a first and second electrode, the piezoelectric body communicated with the pressurized medium such that the piezoelectric body generates an electrical signal that is indicative of the pressure of the medium;
   e) plate mounted adjacent the barrel, the plate retaining the barrel in the housing;
   f) an electronic circuit mounted in the bore toward the second end, the electronic circuit electrically connected to the first and second electrodes, the electronic circuit adapted to receive the electrical signal as an input and provide a conditioned electrical signal as an output; and
   g) a heat shield mounted in the bore adjacent the piezoelectric body, the heat shield adapted to be exposed to the pressurized medium.

15. The pressure sensor according to claim 14, wherein a first and second wire are connected between the first and second electrodes and the electronic circuit.

16. The pressure sensor according to claim 15, wherein the first and second wires pass through a wire passage in the plate and the barrel.

17. The pressure sensor according to claim 14, wherein a plurality of terminals are mounted to the housing and are electrically connected to electronic circuit.

18. The pressure sensor according to claim 17, wherein the terminals are mounted to a cap, the cap being mounted to the housing.

19. The pressure sensor according to claim 14, wherein the barrel is formed from an elastic material.

20. A pressure sensor comprising:
  a) an inner housing having a bore;
  b) an outer housing having a cavity;
  c) a barrel mounted in the bore and retained between the inner and outer housings, the barrel having a cavity;
  d) a piezoelectric body mounted in the barrel cavity, the piezoelectric body having first and second electrodes, the piezoelectric body communicated with a pressurized vessel and generating an electrical signal that is indicative of a pressure being sensed;
  e) an electronic circuit mounted in the bore toward the second end, the electronic circuit electrically connected to the electrodes, the electronic circuit adapted to receive the electrical signal as an input and provide a conditioned electrical signal as an output; and
  f) a heat shield mounted in the bore adjacent the piezoelectric body, the heat shield adapted to be exposed to the pressurized medium.

* * * * *